(12) United States Patent
Cheng

(10) Patent No.: US 11,150,489 B2
(45) Date of Patent: *Oct. 19, 2021

(54) MULTI-FOCAL DISPLAY SYSTEM AND METHOD

(71) Applicant: MAGIC LEAP, INC., Plantation, FL (US)

(72) Inventor: Hui-Chuan Cheng, Cooper City, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/373,227

(22) Filed: Apr. 2, 2019

(65) Prior Publication Data

US 2019/0227333 A1 Jul. 25, 2019

Related U.S. Application Data

(63) Continuation of application No. 14/611,162, filed on Jan. 30, 2015, now Pat. No. 10,317,690.

(Continued)

(51) Int. Cl.
*G02B 30/52* (2020.01)
*G02B 26/10* (2006.01)
(Continued)

(52) U.S. Cl.
CPC ........ *G02B 30/52* (2020.01); *G02B 26/103* (2013.01); *G02B 27/0101* (2013.01); *H04N 13/395* (2018.05); *H04N 13/344* (2018.05)

(58) Field of Classification Search
CPC .. G02B 30/52; G02B 26/103; G02B 27/0101; G02B 30/27; H04N 13/395; H04N 13/344; H04N 13/366
See application file for complete search history.

(56) References Cited

U.S. PATENT DOCUMENTS 1,679,086 A 7/1928 Francis
4,274,854 A 6/1981 Pleibel et al.
(Continued)

FOREIGN PATENT DOCUMENTS

AU 2015266585 5/2015
AU 2015266670 5/2015
(Continued)

OTHER PUBLICATIONS

Notice of Allowance dated May 6, 2019 for Chinese Patent Application No. 201580017626.6, No English Translation.

(Continued)

*Primary Examiner* — Grant Sitta
(74) *Attorney, Agent, or Firm* — Vista IP Law Group LLP

(57) ABSTRACT

Configurations are disclosed for presenting virtual reality and augmented reality experiences to users. The system may comprise a scanning device for scanning one or more frames of image data. The scanning device may be communicatively coupled to an image source to receive the image data. The system may further comprise a variable focus element (VFE) operatively coupled to the scanning device for focusing the one or more frames of image data on an intermediate image plane, wherein the intermediate image plane is aligned to one of a plurality of switchable screens. The plurality of switchable screens may spread light associated with the intermediate image plane to specific viewing distances. The system may also comprise viewing optics operatively coupled to the plurality of switchable screens to relay the one or more frames of image data.

27 Claims, 7 Drawing Sheets

Viewing optics
106

VFE
104

Display
102

Eye
108

Related U.S. Application Data

(60) Provisional application No. 61/934,572, filed on Jan. 31, 2014.

(51) Int. Cl.
    *G02B 27/01*     (2006.01)
    *H04N 13/395*     (2018.01)
    *H04N 13/344*     (2018.01)

(56) References Cited

U.S. PATENT DOCUMENTS

| | | | | |
|---|---|---|---|---|
| 4,472,737 A * | | 9/1984 | Iwasaki | G02B 30/52 348/51 |
| 4,832,464 A | | 5/1989 | Kato et al. | |
| 4,909,613 A | | 3/1990 | Kikuchi | |
| 4,955,687 A | | 9/1990 | Pafford | |
| 5,033,814 A | | 7/1991 | Brown et al. | |
| 5,729,242 A | | 3/1998 | Margerum et al. | |
| 5,751,494 A | | 5/1998 | Takahashi | |
| 5,764,317 A | | 6/1998 | Sadovnik et al. | |
| 5,880,711 A | | 3/1999 | Tamada | |
| 5,949,941 A | | 9/1999 | DiGiovanni | |
| 6,046,720 A | | 4/2000 | Melville et al. | |
| 6,069,650 A * | | 5/2000 | Battersby | H04N 13/305 348/59 |
| 6,120,538 A | | 9/2000 | Rizzo et al. | |
| 6,294,775 B1 | | 9/2001 | Siebel | |
| 6,385,358 B1 | | 5/2002 | Everett et al. | |
| 6,504,629 B1 * | | 1/2003 | Popovich | G02B 5/32 349/201 |
| 6,643,065 B1 | | 11/2003 | Silberman | |
| 6,845,190 B1 | | 1/2005 | Smithwick et al. | |
| 6,959,130 B2 | | 10/2005 | Fauver et al. | |
| 7,077,523 B2 | | 7/2006 | Seo et al. | |
| 7,189,961 B2 | | 3/2007 | Johnston et al. | |
| 7,555,333 B2 | | 6/2009 | Wang et al. | |
| 7,608,842 B2 | | 10/2009 | Johnston | |
| 7,616,382 B2 | | 11/2009 | Inoguchi et al. | |
| 7,784,697 B2 | | 8/2010 | Johnston et al. | |
| 8,248,458 B2 | | 8/2012 | Schowengerdt et al. | |
| 8,259,164 B2 | | 9/2012 | Saito et al. | |
| 8,317,330 B2 | | 11/2012 | Yamazaki et al. | |
| 8,372,004 B2 | | 2/2013 | Krattiger | |
| 8,384,999 B1 | | 2/2013 | Crosby et al. | |
| 8,467,133 B2 | | 6/2013 | Miller | |
| 8,469,525 B2 | | 6/2013 | Kojima et al. | |
| 8,472,120 B2 | | 6/2013 | Border et al. | |
| 8,757,812 B2 | | 6/2014 | Melville et al. | |
| 9,014,517 B2 | | 4/2015 | Katakura et al. | |
| 9,310,559 B2 | | 4/2016 | Macnamara | |
| 9,348,143 B2 | | 5/2016 | Gao et al. | |
| 9,389,424 B1 | | 7/2016 | Schowengerdt | |
| 9,417,452 B2 | | 8/2016 | Schowengerdt et al. | |
| 9,457,412 B2 | | 8/2016 | Schowengerdt et al. | |
| 9,612,403 B2 | | 4/2017 | Abovitz et al. | |
| 9,671,566 B2 | | 6/2017 | Abovitz et al. | |
| 9,740,006 B2 | | 8/2017 | Gao | |
| 9,846,967 B2 | | 12/2017 | Schowengerdt | |
| 9,915,824 B2 | | 3/2018 | Schowengerdt et al. | |
| 10,156,722 B2 | | 12/2018 | Gao et al. | |
| 10,234,687 B2 | | 3/2019 | Welch et al. | |
| 10,254,536 B2 | | 4/2019 | Yeoh et al. | |
| 10,317,690 B2 * | | 6/2019 | Cheng | G02B 30/52 |
| 10,338,391 B2 | | 7/2019 | Yeoh et al. | |
| 10,386,636 B2 | | 8/2019 | Welch | |
| 10,848,740 B2 * | | 11/2020 | Li | G02B 30/25 |
| 2001/0013960 A1 | | 8/2001 | Popovich et al. | |
| 2002/0110077 A1 | | 8/2002 | Drobot et al. | |
| 2002/0163482 A1 | | 11/2002 | Sullivan | |
| 2003/0020879 A1 | | 1/2003 | Sonehara | |
| 2003/0169405 A1 | | 9/2003 | Agostinelli et al. | |
| 2004/0151466 A1 | | 8/2004 | Crossman-Bosworth et al. | |
| 2004/0179764 A1 | | 9/2004 | Melikechi et al. | |
| 2004/0258341 A1 | | 12/2004 | Paolucci et al. | |
| 2005/0173817 A1 | | 8/2005 | Fauver et al. | |
| 2005/0213103 A1 | | 9/2005 | Everett et al. | |
| 2005/0230641 A1 | | 10/2005 | Chun et al. | |
| 2006/0012851 A1 | | 1/2006 | Wu et al. | |
| 2006/0028400 A1 | | 2/2006 | Lapstun et al. | |
| 2006/0072843 A1 | | 4/2006 | Johnston | |
| 2006/0120706 A1 | | 6/2006 | Cho et al. | |
| 2006/0171647 A1 | | 8/2006 | Ye et al. | |
| 2007/0154153 A1 | | 7/2007 | Fomitchov et al. | |
| 2008/0204394 A1 | | 8/2008 | Cho | |
| 2008/0221388 A1 | | 9/2008 | Seibel et al. | |
| 2008/0259463 A1 | | 10/2008 | Shepherd | |
| 2008/0316610 A1 | | 12/2008 | Dobrusskin | |
| 2009/0316116 A1 | | 1/2009 | Melville et al. | |
| 2009/0040138 A1 | | 2/2009 | Takahashi et al. | |
| 2010/0149073 A1 | | 6/2010 | Chaum et al. | |
| 2010/0202054 A1 | | 8/2010 | Niederer | |
| 2010/0289970 A1 | | 11/2010 | Watanabe | |
| 2011/0032602 A1 | | 2/2011 | Rothenberg | |
| 2011/0075257 A1 | | 3/2011 | Hua et al. | |
| 2011/0199582 A1 | | 8/2011 | Kuriki | |
| 2011/0201941 A1 | | 8/2011 | Van Gaal et al. | |
| 2011/0240607 A1 | | 10/2011 | Stecker et al. | |
| 2011/0274435 A1 | | 11/2011 | Fini et al. | |
| 2012/0075534 A1 | | 3/2012 | Katz et al. | |
| 2012/0081800 A1 | | 4/2012 | Cheng et al. | |
| 2012/0105310 A1 | | 5/2012 | Sverdrup et al. | |
| 2012/0113092 A1 | | 5/2012 | Bar-Zeev et al. | |
| 2012/0162549 A1 | | 6/2012 | Gao et al. | |
| 2012/0192991 A1 | | 8/2012 | Gupta et al. | |
| 2013/0050832 A1 | | 2/2013 | Tohara et al. | |
| 2013/0128230 A1 | | 5/2013 | Macnamara | |
| 2013/0176628 A1 | | 7/2013 | Batchko et al. | |
| 2013/0187836 A1 | | 7/2013 | Cheng et al. | |
| 2013/0265647 A1 | | 10/2013 | Kern | |
| 2013/0300635 A1 | | 11/2013 | White et al. | |
| 2013/0300999 A1 | | 11/2013 | DeJong et al. | |
| 2013/0314793 A1 | | 11/2013 | Robbins et al. | |
| 2014/0009845 A1 | | 1/2014 | Cheng et al. | |
| 2014/0035959 A1 | | 2/2014 | Lapstun | |
| 2014/0055844 A1 | | 2/2014 | Cormier et al. | |
| 2014/0063055 A1 | | 3/2014 | Osterhout et al. | |
| 2014/0071539 A1 | | 3/2014 | Gao | |
| 2014/0111616 A1 | | 4/2014 | Blayvas | |
| 2014/0132501 A1 * | | 5/2014 | Choi | G01B 11/2545 345/156 |
| 2014/0140653 A1 | | 5/2014 | Brown et al. | |
| 2014/0168034 A1 | | 6/2014 | Luebke et al. | |
| 2014/0177021 A1 | | 6/2014 | Shimamoto | |
| 2014/0184477 A1 | | 7/2014 | Hino et al. | |
| 2014/0192078 A1 * | | 7/2014 | Gilbert | G09G 3/3426 345/590 |
| 2014/0211322 A1 | | 7/2014 | Bohn et al. | |
| 2014/0236022 A1 | | 8/2014 | Zeng et al. | |
| 2014/0306866 A1 | | 10/2014 | Miller et al. | |
| 2015/0009357 A1 | | 1/2015 | Seibel et al. | |
| 2015/0016777 A1 | | 1/2015 | Abovitz et al. | |
| 2015/0035880 A1 * | | 2/2015 | Heide | G09G 3/36 345/694 |
| 2015/0087257 A1 | | 3/2015 | Balram | |
| 2015/0168702 A1 | | 6/2015 | Harris | |
| 2015/0178939 A1 | | 6/2015 | Bradski et al. | |
| 2015/0205126 A1 | | 7/2015 | Schowengerdt | |
| 2015/0222883 A1 | | 8/2015 | Welch | |
| 2015/0234191 A1 | | 8/2015 | Schowengerdt | |
| 2015/0248012 A1 | | 9/2015 | Schowengerdt | |
| 2015/0268415 A1 | | 9/2015 | Schowengerdt et al. | |
| 2015/0277129 A1 | | 10/2015 | Hua et al. | |
| 2015/0309264 A1 | | 10/2015 | Abovitz et al. | |
| 2015/0346490 A1 | | 12/2015 | Tekolset et al. | |
| 2015/0346495 A1 | | 12/2015 | Welch et al. | |
| 2016/0011419 A1 | | 1/2016 | Gao | |
| 2016/0026253 A1 | | 1/2016 | Bradski et al. | |
| 2017/0038579 A1 | | 2/2017 | Yeoh et al. | |
| 2017/0097506 A1 | | 4/2017 | Schowengerdt et al. | |
| 2017/0097507 A1 | | 4/2017 | Yeoh et al. | |

(56) References Cited

U.S. PATENT DOCUMENTS

| | | |
|---|---|---|
| 2017/0208297 A1 | 7/2017 | Yeoh et al. |
| 2020/0145625 A1 | 5/2020 | Yeoh |

FOREIGN PATENT DOCUMENTS

| | | |
|---|---|---|
| CN | 103105634 | 5/2013 |
| EP | 0785457 A2 | 7/1997 |
| EP | 0785457 A3 | 7/1997 |
| EP | 1962130 A2 | 8/2008 |
| JP | 03-198022 | 12/1989 |
| JP | 06-229825 | 2/1993 |
| JP | H05297313 | 11/1993 |
| JP | 8-166559 | 6/1996 |
| JP | 2002-116410 | 4/2002 |
| JP | 2003-107402 | 4/2003 |
| JP | 2007-514190 | 5/2007 |
| JP | 2010-008948 | 1/2010 |
| JP | 2014-17776 | 1/2014 |
| JP | 2014-505381 | 2/2014 |
| JP | 2014-092696 | 5/2014 |
| KR | 10-2008-0079005 | 8/2008 |
| KR | 10-2013-0139280 | 12/2013 |
| WO | WO 03081320 | 10/2003 |
| WO | WO 2006017771 | 2/2006 |
| WO | WO 2006070308 | 7/2006 |
| WO | WO 2009/014525 | 1/2009 |
| WO | WO 2011/134169 | 11/2011 |
| WO | WO 2012/088478 | 6/2012 |
| WO | WO 2013/188464 | 12/2013 |
| WO | WO 2014/062912 | 4/2014 |
| WO | WO 2014053194 | 4/2014 |
| WO | WO 2014/151877 | 9/2014 |
| WO | WO 2014144526 | 9/2014 |
| WO | WO 2015/081313 | 6/2015 |

OTHER PUBLICATIONS

First Examination Report dated May 3, 2019 for Australian Patent Application No. 2015210708.
Response to Extended European Search Report for European Patent Application No. 16828424.8 filed Jun. 13, 2019.
Response to Extended European Search Report for European Patent Application No. 17741926.4 filed Jul. 17, 2019.
Response to Non-Final Office Action filed Jul. 18, 2019 for U.S. Appl. No. 15/286,215.
Advisory Action dated May 15, 2019 for U.S. Appl. No. 15/410,456.
Response to Final Office Action filed Jul. 26, 2019 for U.S. Appl. No. 15/410,456.
Examination Report for European Application No. 15743704.7 dated Aug. 1, 2019, 6 pages.
Notice of Allowance dated Oct. 9, 2019 for U.S. Appl. No. 15/410,456.
Final Office Action dated Nov. 1, 2019 for U.S. Appl. No. 15/286,215.
Response to Examination Report for European Application No. 15743704.7 filed Dec. 10, 2019, 10 pages.
Response to Examination Report for Australian Application No. 2015210708 filed Dec. 11, 2019, 18 pages.
Office Action dated Oct. 31, 2019 for Chinese Patent Application No. 201780007235.5, including English translation, (12 pages).
Notice of Acceptance dated Dec. 16, 2019 for Australian Application No. 2015210708.
Amendment After Final dated Jan. 31, 2020 for U.S. Appl. No. 15/286,215.
Examination Report for New Zealand Application No. 722904 dated Feb. 7, 2020, 2 pages.
Response to Office Action filed Mar. 10, 2020 for Chinese Patent Application No. 201780007235.5, no English translation, (5 pages).
Office Action dated Jan. 29, 2020 for Japanese Patent Application No. 2019-65723, including English translation, (10 pages).
Cited Ref2 for Japanese Patent Application No. 2019-65723, no English translation, (11 pages).
Office Action dated Jan. 6, 2020 for Chinese Patent Application No. 201680042281.4, including English translation, (15 pages).
Response to Office Action filed Feb. 26, 2020 for Chinese Patent Application No. 201580041059.8, no English Translation, (9 pages).
Office Action dated Dec. 12, 2019 for Chinese Patent Application No. 201580017627.0, including English translation provided by Chinese associate, 5 pages.
Response to Office Action filed Jan. 10, 2020 for Chinese Patent Application No. 201580041033.3, no English Translation, (4 pages).
Notice of Allowance for Japanese Appln. No. 2016-570034 dated Jan. 8, 2020.
Response to Office Action filed Feb. 19, 2020 for Chinese Patent Application No. 201580017627.0, no English Translation, (9 pages).
Notice of Allowance dated Mar. 4, 2020 for U.S. Appl. No. 16/261,455.
Office Action dated Feb. 6, 2020 for Korean Patent Application No. 10-2016-7023727, (2 pages).
Response to 2nd Office Action filed Mar. 20, 2019 for Chinese application No. 201580017627.0, in Chinese language only.
Response to Examination Report filed Mar. 22, 2019 for Australian application No. 2015266670.
Notice of Allowance dated Apr. 1, 2019 for JP application No. 2016-549247.
Office Action dated Mar. 15, 2019 for Japanese Application No. 2016-570027 with English Translation from foreign associate.
Notice of Allowance dated Apr. 9, 2019 for U.S. Appl. No. 14/611,154.
Office Action dated Apr. 1, 2019 for Japanese Application No. 2016-570034 with English Translation from foreign associate.
Office Action dated Mar. 1, 2019 for Chinese Application No. 201580041033.3, including translation provided by Chinese associate.
Non-Final Office Action dated Mar. 22, 2019 for U.S. Appl. No. 15/286,215.
Response to Final Office Action for U.S. Appl. No. 15/410,456, filed Mar. 27, 2019.
Response to Extended European Search Report for EP Application No. 16854353.6 filed Apr. 2, 2019.
Extended European Search Report for EP Application No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Non-Final Office Action for U.S. Appl. No. 15/410,456 dated Nov. 3, 2017.
Non-Final Office Action for U.S. Appl. No. 15/214,319 dated Oct. 11, 2017.
Non-Final Office Action for U.S. Appl. No. 15/287,637 dated Oct. 6, 2017.
Non-Final Office Action for U.S. Appl. No. 14/611,154, dated Mar. 28, 2017.
Final Office Action for U.S. Appl. No. 14/611,154, dated Jul. 26, 2017.
PCT International Search Report and Written Opinion for International Appln. No. PCT/US15/13993, Applicant Magic Leap, Inc., dated Jun. 10, 2015, 7 pages.
Non-Final Office Action for U.S. Appl. No. 14/726,429, dated Sep. 2, 2016.
Final Office Action for U.S. Appl. No. 14/726,429, dated May 17, 2017.
PCT International Search Report and Written Opinion for International Appln. No. PCT/US15/33416, Applicant Magic Leap, Inc., dated Oct. 26, 2015, 12 pages.
Hua, et al. "An Optical See-through Multi-Focal-Plane Stereoscopic Display Prototype Enabling Nearly-Correct Focus Cues," Stereoscopic Displays and Applications XXIV, Proc. of SPIE-IS&T Electronic Imaging, SPIE vol. 8648, 86481A, Mar. 12, 2013. doi: 10.1117/12.2005117.
Hu, Xinda. "Development Of The Depth-Fused Multi-Focal-Plane Display Technology," The University of Arizona, 2014.
Cheng, et al. "Design of a wide-angle, lightweight head-mounted display using free-form optics tiling," Optics Letters, vol. 36, No. 11, Jun. 1, 2011, 2098-2100.

(56) References Cited

OTHER PUBLICATIONS

Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11), Jun. 2, 2014, 13896-13903. OI: 10.1364/OE.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Appln. No. PCT/US15/33412, Applicant Magic Leap, Inc., dated Oct. 26, 2015, 13 pages.
Non-Final Office Action for U.S. Appl. No. 14/726,396, dated Mar. 15, 2017.
Final Office Action for U.S. Appl. No. 14/726,396, dated Aug. 16, 2017.
Response to Final Office Action for U.S. Appl. No. 14/726,429, filed Aug. 17, 2017.
Response to Non-Final Office Action for U.S. Appl. No. 14/611,154, filed Jun. 28, 2017.
Response to Non-Final Office Action for U.S. Appl. No. 14/726,396, filed Jun. 15, 2017.
Notice of Allowance for U.S. Appl. No. 14/726,429 dated Sep. 13, 2017.
Extended European Search Report for EP Application No. 15743225.3 dated Sep. 19, 2017.
Amendment and Response to Final Office Action for U.S. Appl. No. 14/611,154, filed Oct. 26, 2017.
Response to Non Final Office Action for U.S. Appl. No. 14/726,429, filed Feb. 28, 2017.
Response to Final Office Action for U.S. Appl. No. 14/726,396, filed Nov. 16, 2017.
Amended Claims for EP Application No. 15799569.7 filed on Dec. 30, 2016.
Non-Final Office Action for U.S. Appl. No. 14/156,366 dated Sep. 3, 2015.
Final Office Action for U.S. Appl. No. 14/156,366 dated Apr. 1, 2016.
PCT International Search Report and Written Opinion for International Appln. No. PCT/US14/11736, Applicant Magic Leap, Inc., dated May 8, 2014 (11 pages).
Non-Final Office Action for U.S. Appl. No. 14/611,162 dated Dec. 7, 2016.
Response to Non-Final Office Action for U.S. Appl. No. 14/611,162 dated Apr. 7, 2017.
PCT International Search Report and Written Opinion for International Appln. No. PCT/US15/13998, Applicant Magic Leap, Inc., dated May 1, 2015 (9 pages).
Notice of Allowance for U.S. Appl. No. 14/677,931 dated Feb. 12, 2016.
PCT International Search Report and Written Opinion for International Appln. No. PCT/US2016/043001, Applicant Magic Leap, Inc., dated Sep. 22, 2016 (9 pages).
Non-Final Office Action filed Dec. 21, 2017 for U.S. Appl. No. 14/726,396.
Non-Final Office Action filed Dec. 26, 2017 for U.S. Appl. No. 14/611,154.
Extended European Search Report for EP Appln. No. 15799569.7 dated Jan. 18, 2018.
Extended European Search Report for EP Appln. No. 15799774.3 dated Jan. 2, 2018.
Shiro Suyama et al., "Three-Dimensional Display System with Dual-Frequency Liquid-Crystal Varifocal Lens", Jpn J. Appl. Phys., vol. 39 (2000) pp. 480-484, Part1, No. 2A, Feb. 2000, 6 pp.
Amendment after Non-Final Office Action for U.S. Appl. No. 14/726,396 dated Mar. 21, 2018.
Amendment after Non-Final Office Action for U.S. Appl. No. 14/611,154 dated Mar. 23, 2018.
Response to Extended EP Search report filed Mar. 29, 2018 for EP application No. 15743704.7.
Office action dated Feb. 2, 2018 for Chinese application No. 201580041059.8, office action is in Chinese language with a translation provided by the foreign associate.
Response to Extended EP Search report filed Apr. 12, 2018 for EP application No. 15743225.3.
Non-Final Office Action for U.S. Appl. No. 15/819,887, dated Apr. 19, 2018.
Final Office Action for U.S. Appl. No. 14/611,154, dated Apr. 30, 2018.
Amendment and Response to Non-Final Office Action for U.S. Appl. No. 15/287,637, filed Jan. 8, 2018.
Amendment and Response to Non-Final Office Action for U.S. Appl. No. 15/214,319, filed Jan. 11, 2018.
Response to Non-Final Office Action filed Feb. 5, 2018 for U.S. Appl. No. 15/410,456.
Non-Final Office Action dated Jan. 17, 2018 for U.S. Appl. No. 15/286,215.
Response to European Office Action for EP Appln. No. 15743704.7 dated Mar. 29, 2018.
Response to Non-Final Office Action filed Apr. 16, 2018 for U.S. Appl. No. 15/286,215.
Non-Final Office Action filed May 23, 2018 for U.S. Appl. No. 15/287,637.
Final Office Action dated Jun. 5, 2018 for U.S. Appl. No. 15/214,319.
Non Final office action dated Jun. 18, 2018 for U.S. Appl. No. 15/410,456.
Response to Final Office Action for U.S. Appl. No. 15/214,319, filed Aug. 6, 2018.
Response to Non-Final Office Action for U.S. Appl. No. 15/287,637, filed Aug. 23, 2018.
Office Action dated Jul. 20, 2018 for Chinese Application No. 201580017626.6, including translation provided by Chinese associate.
Non-Final Office Action dated Sep. 12, 2018 for U.S. Appl. No. 15/286,215.
Response to Non-Final Office Action for U.S. Appl. No. 15/410,456, filed Sep. 17, 2018.
Extended European Search Report for EP Application No. 16854353.6 dated Sep. 14, 2018.
Notice of Allowance dated Sep. 25, 2018 for U.S. Appl. No. 15/214,319.
Response to Final office action filed Jul. 30, 2018 for U.S. Appl. No. 14/611,154.
Office action dated Apr. 3, 2018 for Chinese application No. 201580017627.0, in Chinese language with English translation provided by the foreign associate.
Amendment after Non-Final Office Action filed Jul. 19, 2018 for U.S. Appl. No. 15/819,887.
Notice of Allowance for U.S. Appl. No. 14/726,396 dated Jul. 2, 2018.
Response to Extended European Search Report filed Jul. 30, 2018 for EP application No. 15799774.3.
Response to Extended European Search Report dated Aug. 14, 2018 for EP application No. 15799569.7, 11 pages.
Notice of Allowance dated Sep. 10, 2018 for U.S. Appl. No. 15/819,887.
Office Action dated Sep. 25, 2018 for Japanese Application No. 2016-549247 with English Translation from foreign associate.
Office Action dated Oct. 6, 2018 for Australian Application No. 2015210704.
Notice of Allowance for U.S. Appl. No. 14/726,396 dated Sep. 28, 2018.
Office Action dated Sep. 7, 2018 for Australian Application No. 2015266670.
Office Action dated Oct. 8, 2018 for Chinese Patent Appln. No. 20150041033.3, in Chinese language only.

(56) References Cited

OTHER PUBLICATIONS

Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Non Final Office Action dated Dec. 4, 2018 for U.S. Appl. No. 14/611,154.
Response to Office action filed Aug. 13, 2018 for Chinese application No. 201580017627.0, in Chinese language with claims in English.
Final office Action dated Jan. 28, 2019 for U.S. Appl. No. 15/410,456.
Notice of Allowance dated Jan. 25, 2019 for U.S. Appl. No. 15/287,637.
Response to Office action filed Mar. 4, 2019 for U.S. Appl. No. 14/611,154.
Extended European Search Report dated Dec. 19, 2018 for EP Application No. 17741926.4.
Notice of Allowance dated Mar. 5, 2019 for JP application No. 2016-549347.
Response to Office action filed Dec. 18, 2018 for Japan application No. 2016-54927, in Japanese language with claims in English.
Response to 2nd Office Action filed Dec. 25, 2018 for Chinese application No. 201580041059.8, in Chinese language.
Office Action dated Jan. 11, 2019 for Chinese Application No. 201580017627.0, including translation provided by Chinese associate.
Office action dated Jan. 15, 2019 for Israeli application No. 249091, in Israeli language with a translation provided by the foreign associate.
Extended European Search Report dated Sep. 27, 2018 for EP Application No. 16854232.2.
Office Action dated Sep. 21, 2018 for Japanese Application No. 2016-549347, including translation provided by Japanese associate.
Extended European Search Report dated Nov. 20, 2018 for EP Application No. 16828424.8.
Office Action dated Nov. 29, 2018 for Japanese Application No. 2016-549347, including translation provided by Japanese associate.
Office Action dated Dec. 3, 2018 for Chinese Application No. 201580017626.6, including translated claims.
Notice of Allowance for U.S. Appl. No. 15/214,319 dated Dec. 3, 2018.
Response to Non-Final Office Action for U.S. Appl. No. 15/286,215, filed Nov. 30, 2018.
PCT International Search Report and Written Opinion of the International Searching Authority for PCT/US15/13998, Applicant Magic Leap, Inc., dated May 1, 2015.
Response to Examination Report filed May 2, 2019 for Australian application No. 2015210704.
Notice of Acceptance dated Apr. 26, 2019 for Australian Application No. 2015266670.
Response to OA Filed May 13, 2019 for Israeli application No. 249091, in Israeli language with translation provided by foreign associate.
Office Action dated May 30, 2019 for U.S. Appl. No. 16/261,455.
Response to 1st Office Action filed Jun. 11, 2019 for Japanese application No. 2016-570027, in Japanese language only.
Response to 1st Office Action filed Jun. 11, 2019 for Japanese application No. 2016-570034, in Japanese language only.
Office action dated Jun. 4, 2019 for Chinese application No. 201580041059.8, in Chinese language with a translation provided by the foreign associate.
Office Action dated Jun. 14, 2019 for Chinese Patent Application No. 201580017627.0, including translation provided by Chinese associate.
Response to OA filed Jul. 10, 2019 for Chinese Patent Application No. 201580041033.3, no English translation provided by Chinese associate, only amend claims in English.
Penultimate Office Action dated Aug. 6, 2019 for Japanese Application No. 2016-570027 with English Translation from foreign associate, 5 pages.
Response to OA filed Aug. 14, 2019 for Chinese Patent Application No. 201580041059.8, no English translation provided by Chinese associate, only amend claims in English, 80 pages.
Response to OA filed Aug. 23, 2019 for Chinese Patent Application No. 201580017627.0, no English translation provided by Chinese associate, 5 pgs.
Penultimate Office Action dated Aug. 1, 2019 for Japanese Application No. 2016-570034 with English Translation from foreign associate, 4 pages.
Amendment Response to OA filed for U.S. Appl. No. 16/261,455 dated Aug. 29, 2019.
Examination Report for New Zealand Application No. 727361 dated Sep. 13, 2019, 3 pages.
Examination Report for Australian Application No. 2015266585 dated Sep. 18, 2019, 4 pages.
Response to Penultimate Office Action filed Oct. 29, 2019, for Japanese Application No. 2016-570034 no English Translation, 3 pages.
Examination Report for New Zealand Application No. 727365 dated Oct. 31, 2019, 5 pages.
Foreign OA Response for CN Patent Appln. No. 201680042281.4 dated Oct. 19, 2020.
Foreign Exam Report for AU Patent Appln. No. 2016336546 dated Sep. 21, 2020.
Foreign OA for IL Patent Appln. No. 260064 dated Sep. 21, 2020.
Foreign OA for JP Patent Appln. No. 2018-517428 dated Sep. 29, 2020.
Foreign OA for JP Patent Appln. No. 2018-517279 dated Oct. 2, 2020.
Peng Y. et al., Large Vibration Fiber Scanner with two spring constants, 2011 Proceedings of JSPE Semestrial Meeting, Japan, Sep. 5, 2011, pp. 990-991 (a document showing a well-known technique).
1st Examination Report for AU Patent Appln. No. 2017209171 dated Oct. 20, 2020.
Foreign OA Response for IN Patent Appln. No. 201647026959 dated Oct. 21, 2020.
1st Patent Exam Report for NZ Patent Appln. No. 741832 dated Nov. 9, 2020.
Foreign OA for CN Patent Appln. No. 201680057392.2 dated Oct. 19, 2020.
Foreign OA For CN Patent Application No. 201680057391.8 dated Nov. 2, 2020.
Foreign Rejection Deciscion for CN Patent Appln. No. 201780007235.5 dated Nov. 13, 2020.
Foreign OA for JP Patent Application No. 2018-537615 dated Nov. 27, 2020.
Foreign OA Response for JP Patent Application No. 2019-65723 dated Dec. 16, 2020.
Foreign Exam Report for AU Patent Appln. No. 2016333970 dated Dec. 17, 2020.
Foreign OA Response for JP Patent Appln. No. 2018-517279 dated Dec. 22, 2020.
Foreign Response for IL Patent Appln. No. 246995 dated Sep. 24, 2020.
1st Examination Report for EP Patent Appln. No. 15799774.3 dated Feb. 20, 2020.
Foreign Office Action for Japanese Patent Appln. No. 2016-570027 dated Feb. 10, 2020.
Examiner's Report for New Zealand Appln. No. 722903 dated Feb. 7, 2020.
Response to Examination Report for Australian Application No. 2015266585 filed Apr. 8, 2020, 18 pages.
Response to First Examination Report for New Zealand Application No. 727365 dated Apr. 21, 2020.
Response to First Examination Report for New Zealand Application No. 727361 dated Mar. 9, 2020.
Foreign Office Action for Indian Patent Appln. No. 201647026958 dated Apr. 23, 2020.

(56) References Cited

OTHER PUBLICATIONS

Office Action Response filed Apr. 30, 2020 for Japanese Application No. 2016-570027, in Japanese language with claims in English.
Foreign Notice of Allowance for CA Patent Appln. No. 2938264 dated Apr. 9, 2020.
Foreign Office Action for New Zealand Patent Appln. No. 722904 dated May 8, 2020.
Foreign Notice of Allowance for JP Patent Appln. No. 2016-570027 dated May 8, 2020.
First Examination Report dated May 12, 2019 for New Zealand Patent Application No. 722903.
Notice of Acceptance for AU Patent Appln. No. 2015266585 dated May 11, 2020.
Foreign Office Action for KR Patent Appln. No. 10-2016-7023729, dated May 25, 2020.
Foreign Office Action for CN Patent Appln. No. 201580041033.3, dated May 11, 2020.
Foreign Office Action for KR Patent Appln. No. 10-2016-7036877, dated Jun. 19, 2020.
Extended European Search Report for EP Patent Appln. No. 20173220.3 dated Jun. 18, 2020.
Foreign Office Action for CN Patent Appln. No. 201580041033.3, dated Jul. 15, 2020.
Foreign Examiner's Report for CA Patent Appln. No. 2950429 dated Jul. 9, 2020.
Foreign Office Action Response for European Patent Appln. No. 15799774.3 dated Jul. 1, 2020.
Foreign Response for KR Patent Appln. No. 10-2016-7023729 dated Jul. 27, 2020.
Foreign OA Amendment for KR Patent Appln. No. 10-2016-7036877 dated Aug. 14, 2020.
1st Examination Report for AU Patent Appln. No. 2016262579 dated Jul. 17, 2020.
1st Examination Report for AU Patent Appln. No. 2019219728 dated Aug. 19, 2020.
Foreign Office Action for IL Patent Appln. No. 249089 dated Jul. 7, 2020.
Foreign Notice of Allowance for CA Patent Appln. No. 2938262 dated Aug. 5, 2020.
Foreign Office Action for KR Patent Appln. No. 10-2016-7023729 dated Sep. 14, 2020.
Foreign OA Response for JP Patent Appln. No. 2019-87069 dated Sep. 15, 2020.
Foreign OA Response for KR Patent Appln. No. 10-2016-7036875 dated Sep. 18, 2020.
Foreign Office Action for JP Patent Application No. 2019-108514 dated Sep. 2, 2020.
Foreign Response for NZ Patent Appln. No. 727365 dated Aug. 11, 2020.
Foreign 3rd Patent Exam Report for NZ Patent Appln. No. 727365 dated Sep. 30, 2020.
Extended European Search Report and Written Opinion for EP Patent Appln. No. 20156688.2 dated Apr. 29, 2020.
Foreign Office Action for Chinese Patent Appln. No. 201680057391.8 dated Mar. 10, 2020.
Non-Final Office Action for U.S. Appl. No. 15/286,215 dated Apr. 3, 2020.
Foreign Office Action for Chinese Patent Appln. No. 201680042281.4 dated May 21, 2020 (no translation available).
Foreign Office Action for Chinese Patent Appln. No. 201680057392.2 dated Apr. 14, 2020.
Amendment Response to NFOA for U.S. Appl. No. 15/286,215 dated Jun. 26, 2020.
Foreign Office Action for Chinese Patent Appln. No. 201680057391.8 dated Jul. 17, 2020.
Foreign Office Action for Chinese Patent Appln. No. 201780007235.5 dated Jul. 14, 2020.
Foreign Office Action Response for Chinese Patent Appln. No. 201680057392.2 dated Aug. 28, 2020 (no translation available).
1st Examination Report for EP Patent Appln. No. 16854353.6 dated Aug. 28, 2020.
Second Office Action for CN Patent Appln. No. 201680042281.4 dated Aug. 4, 2020.
Amendment Response to FOA for U.S. Appl. No. 16/391,577 dated Sep. 21, 2020.
Foreign OA Response for CN Patent Appln. No. 201780007235.5 dated Sep. 23, 2020.
Foreign OA Response for JP Patent Appln. No. 2018-502353 dated Sep. 24, 2020.
Notice of Allowance for U.S. Appl. No. 15/286,215 dated Oct. 7, 2020.
Notice of Allowance for U.S. Appl. No. 16/391,577 dated Oct. 7, 2020.
Non-Final Office Action for U.S. Appl. No. dated Oct. 7, 2020.
Foreign Notice of Allowance for JP Patent Appln. No. 2018-502353 dated Oct. 9, 2020.
Foreign OA Response for KR Patent Appln. No. 10-2016-7023729 dated Oct. 14, 2020.
Foreign Office Action for JP Patent Appln. No. 2019-65723 dated Sep. 28, 2020.
Foreign Notice of Allowance for KR Patent Appln. No. 10-2016-7036875 dated Oct. 14, 2020.
Foreign OA Response for KR Patent Appln. No. 10-2016-7036877 dated Oct. 16, 2020.
Foreign OA Response for CA Patent Appln. No. 2950429 dated Oct. 26, 2020.
Foreign Notice of Allowance for KR Patent Appln. No. 10-2016-7023729 dated Oct. 21, 2020.
Non-Final Office Action for U.S. Appl. No. 16/460,315 dated Jul. 28, 2020.
1st Patent Exam Report for NZ Patent Appln. No. 762432 dated Sep. 4, 2020.
Amendment Response to NFOA for U.S. Appl. No. 16/460,315 dated Oct. 28, 2020.
Foreign Amendment Response for NZ Patent Appln. No. 727365 dated Oct. 29, 2020.
Foreign OA Response for IN Patent Appln. No. 201647026958 dated Oct. 22, 2020.
Foreign OA for JP Patent Appln. No. 2019-195867 dated Oct. 23, 2020.
Foreign OA Response for KR Patent Appln. No. 10-2016-7036877 dated Nov. 13, 2020.
Final Office Action for U.S. Appl. No. 16/460,315 dated Nov. 19, 2020.
First Exam Report for AU Patent Appln. No. 2019213313 dated Sep. 8, 2020.
Foreign OA Response for JP Patent Application No. 2019-108514 dated Nov. 25, 2020.
Foreign Final OA for JP Patent Application No. 2019-87069 dated Nov. 4, 2020.
Non-Final Office Action for U.S. Appl. No. 16/123,711 dated Nov. 25, 2020.
Foreign Notice of Allowance for KR Patent Appln. No. 10-2016-7036877 dated Dec. 3, 2020.
Foreign OA Response for JP Patent Appln. No. 2019-195867 dated Dec. 23, 2020.
Foreign Response for AU Patent Application No. 2019280001 dated Dec. 23, 2020.
Foreign Notice of Allowance for JP Patent Appln. No. 2019-108514 dated Dec. 28, 2020.
Foreign Notice of Allowance for CA Patent Appln. No. 2950429 dated Dec. 15, 2020.
Foreign Notice of Allowance for CN Patent Appln. No. 201580041033.3 dated Dec. 16, 2020.
Foreign Response for IL Patent Appln. No. 249089 dated Jan. 3, 2021.
Foreign Response for CN Patent Appln. No. 201680057392.2 dated Dec. 25, 2020.
Foreign Response for JP Patent Appln. No. 2018-517428 dated Dec. 24, 2020.
Response to Non-Final Office Action for U.S. Appl. No. 16/737,789, filed Jan. 5, 2021.

(56) References Cited

OTHER PUBLICATIONS

Foreign Response for CN Patent Appln. No. 201680057391.8 dated Jan. 5, 2021.
Foreign OA Response for IL Patent Appln. No. 260064 dated Jan. 13, 2021.
Notice of Allowance for U.S. Appl. No. 15/286,215 dated Jan. 21, 2021.
Foreign Exam Report for IN Patent Appln. No. 201847014197 dated Jan. 21, 2021.
Foreign Response for AU Patent Appln. No. 2016296723 dated Jan. 21, 2021.
Foreign Notice of Allowance for IL Patent Appln. No. 260064 dated Jan. 20, 2021.
Foreign Response for NZ Patent Appln. No. 739170 dated Feb. 3, 2021.
Foreign Exam Report for NZ Patent Appln. No. 739170 dated Feb. 9, 2021.
Foreign Response for CN Patent Appln. No. 201780007235.5 dated Feb. 25, 2021.
Foreign Response for JP Patent Appln. No. 2018-537615 dated Feb. 24, 2021.
Foreign Exam Report for IN Patent Appln. No. 201847000653 dated Feb. 26, 2021.
Foreign Exam Report for IN Patent Appln. No. 201847031358 dated Feb. 15, 2021.
Foreign Response for IN Patent Appln. No. 201847031358 dated Feb. 23, 2021.
Foreign OA for CN Patent Appln. No. 201680057392.2 dated Feb. 3, 2021.
Foreign NOA for CN Patent Appln. No. 201680042281.4 dated Mar. 2, 2021.
Foreign Notice of Appeal for JP Patent Appln. No. 2019-087069 dated Mar. 3, 2021.
Foreign Response for JP Patent Appln. No. 2019-087069 dated Mar. 3, 2021.
Foreign Exam Report for CA Patent Appln. No. 2950425 dated Feb. 9, 2021.
Foreign Response for EP Patent Appln. No. 20173220.3 dated Mar. 19, 2021.
RCE Amendment and response Final Office Action for U.S. Appl. No. 16/460,315, filed Feb. 19, 2021.
Amendment Response for U.S. Appl. No. 16/123,711 dated Feb. 25, 2021.
Non-Final Office Action for U.S. Appl. No. 16/460,315 dated Apr. 5, 2021.
Response for CA Patent Appln. No. 2950425 dated May 14, 2021.
First Exam Report for EP Patent Appln. No. 15743225.3 dated Apr. 29, 2021.
Foreign NOA for CN Patent Appln. No. 201780007235.5 dated Apr. 7, 2021.
Foreign OA for for CN Patent Appln. No. 201680057391.8 dated Apr. 14, 2021.
Foreign Response for NZ Patent Appln. No. 762432 dated Apr. 1, 2021.
Foreign Resonse for AU Patent Appln. No. 2019213313 dated Apr. 12, 2021.
Foreign Exam Report for NZ Patent Appln. No. 741830 dated Feb. 24, 2021.
Foreign Response for NZ Patent Appln. No. 741832 dated May 4, 2021.
Foreign OA for JP Patent Appln. No. 2019-195867 dated Mar. 23, 2021.
Foreign NOA for JP Patent Appln. No. 2019-87069 dated Apr. 8, 2021.
Foreign NOA for IL Patent Appln. No. 246996 dated Feb. 17, 2021.
Foreign OA for CN Patent Appln. No. 201910654692.4 dated Feb. 24, 2021.
Foreign Response for CN Patent Appln. No. 201680057392.2 dated Apr. 16, 2021.

\* cited by examiner

MULTI-FOCAL DISPLAY SYSTEM AND METHOD

CROSS-REFERENCE TO RELATED APPLICATION(S)

This application is a continuation of U.S. patent application Ser. No. 14/611,162 filed on Jan. 30, 2015 entitled "MULTI-FOCAL DISPLAY SYSTEM AND METHOD", which claims priority from U.S. Provisional Patent Application Ser. No. 61/934,572 filed on Jan. 31, 2014 entitled "MULTI-FOCAL DISPLAY SYSTEM AND METHOD". This application is cross-related to U.S. Provisional Patent Application Ser. No. 62/005,834 entitled "METHOD AND SYSTEM FOR CREATING FOCAL PLANES IN VIRTUAL AND AUGMENTED REALITY," U.S. patent application Ser. No. 14/555,585, entitled "VIRTUAL AND AUGMENTED REALITY SYSTEMS AND METHODS, U.S. Pat. No. 6,046,720, entitled "POINT SOURCE SCANNING APPARATUS AND METHOD," U.S. Pat. No. 7,555,333, entitled "INTEGRATED OPTICAL SCANNING IMAGE ACQUISITION AND DISPLAY," U.S. patent application Ser. No. 11/573,118, entitled "VARIABLE FIXATION VIEWING DISTANCE SCANNED LIGHT DISPLAYS," and U.S. patent application Ser. No. 12/468,832, entitled "SCANNED LASER PROJECTION DISPLAY DEVICES AND METHODS FOR PROJECTING ONE OR MORE IMAGES ONTO A SURFACE WITH A LIGHT-SCANNING OPTICAL FIBER". The content of the aforementioned patent applications is hereby expressly incorporated by reference in its entirety.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

There are numerous challenges when it comes to presenting 3D virtual content to a user of an AR system. A central premise of presenting 3D content to a user involves creating a perception of multiple depths. As in some virtual content appears closer to the user, while other virtual content may appear to be coming from farther away. Thus, to achieve 3D perception, the AR system is configured to deliver virtual content at different focal planes relative to the user.

The U.S. provisional patent applications listed above present systems and techniques to generate various focal planes in the context of AR systems. The design of these virtual reality and/or augmented reality systems presents numerous challenges, including the speed of the system in delivering virtual content, quality of virtual content, eye relief of the user, size and portability of the system, and other system and optical challenges.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users. In one aspect, a system for displaying virtual content is disclosed.

In one or more embodiments, an augmented reality display system, comprises a scanning device for scanning one or more frames of image data, wherein the scanning device is communicatively coupled to an image source to receive the image data, a variable focus element (VFE) operatively coupled to the scanning device for focusing the one or more frames of image data on an intermediate image plane, wherein the intermediate image plane is aligned to one of a plurality of switchable screens, and the plurality of switchable screens spreads light associated with the intermediate image plane to specific viewing distances, and viewing optics operatively coupled to the plurality of switchable screens to relay the one or more frames of image data.

In another aspect, a method for displaying augmented reality comprises providing one or more frames of image data, scanning light associated with the one or more frames of image data in a scanning pattern, varying the focus of the scanned light, through a variable focus element (VFE), such that the one or more frames of image data is brought into focus on one of plurality of switchable screens, and spreading the focused light, through the one of the plurality of switchable screens, wherein the switchable screens correspond to different viewing distances.

In yet another aspect, an augmented reality display system comprises a scanning device operatively coupled to an image source for scanning an image in a scanning pattern, a variable focus element (VFE) operatively coupled to the scanning light display to variably focus the image, and a processor coupled to the VFE to vary a drive signal of the VFE as a function of the scanning pattern of the display in order to produce a substantially flat image field to correct a field curvature of the image.

In another aspect, a method for displaying augmented reality comprises providing one or more frames of image data, scanning light associated with the one or more frames of image data in a scanning pattern, and adjusting a drive signal of a variable focus element (VFE) in accordance to the scanning pattern to correct for a field curvature of the one or more frames of image data, producing a substantially flat image field.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
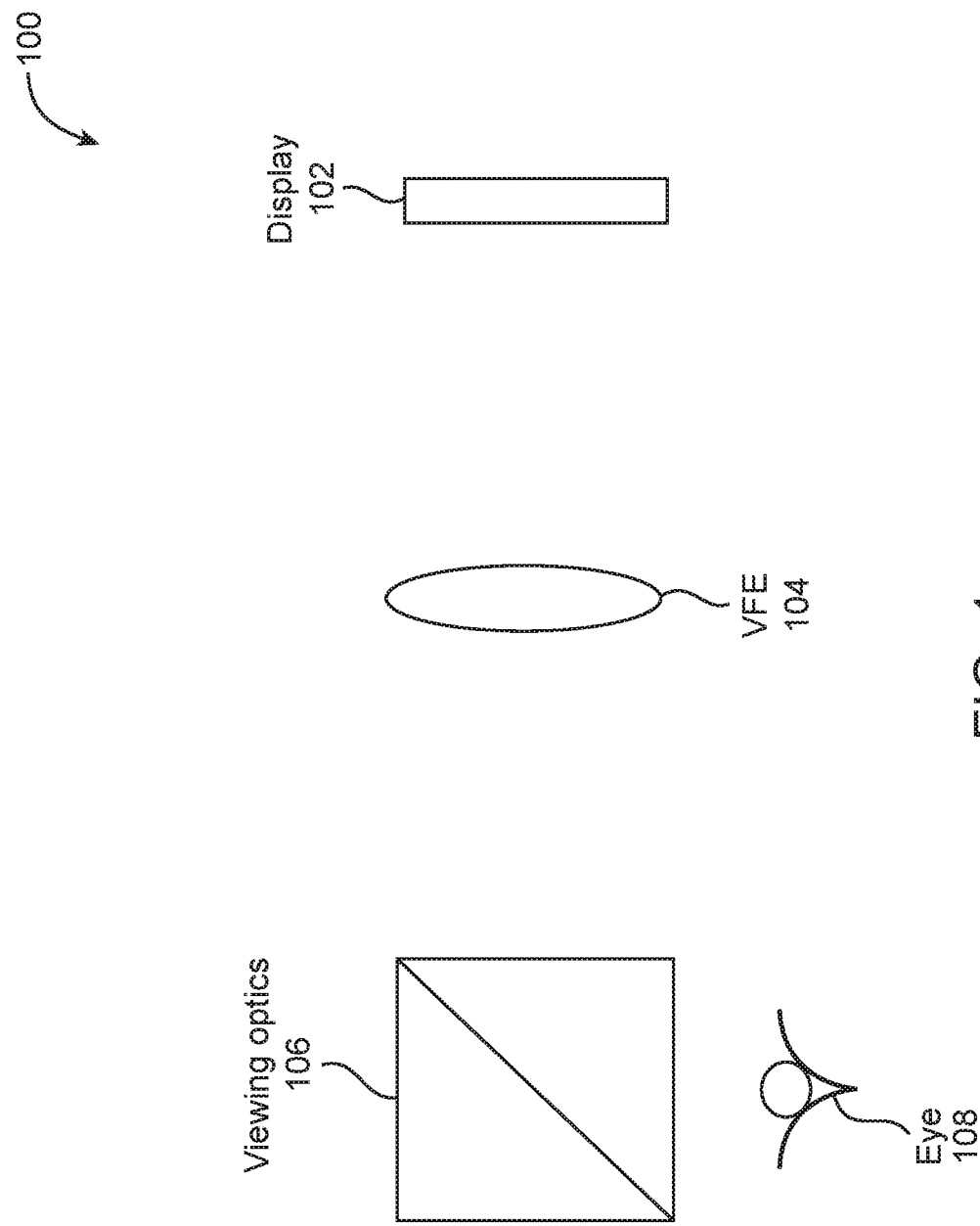
FIG. 1 illustrates a plan view of an optical system configuration including variable focus element (VFE) along with other optics to display content, according to one example embodiment.

Various embodiments of the invention are directed to methods, systems, and articles of manufacture for implementing multi-scenario physically-aware design of an electronic circuit design in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As discussed in U.S. Provisional Application Ser. No. 61/909,774(now U.S. patent application Ser. No. 14/555,585); U.S. Pat. Nos. 6,046,720; 7,555,333, 784,697; and U.S. patent applications Ser. Nos. 11/573,118 and 12/468,832, each of which is incorporated by reference herein in its entirety, a variable focus element (hereinafter "VFE") may be used to adjust the wavefront (e.g., focus) of an image in a dynamic fashion, and may be used to generate multi-focal 3D imagery. The VFE may enable analog focus modulation, or may switch between discrete focus states.

This disclosure describes the use of a plurality of switchable screens, such as switchable polymer dispersed liquid crystal (hereinafter "PDLC") diffusers to spread incident light, such as for the purpose of increasing the effective numerical aperture of an image and/or increasing the size of an eyebox or exit pupil of viewing optics. For instance, a PDLC screen can be switched between a substantially transparent state and a substantially diffusing state.

The plurality of switchable screens is, in preferred embodiments, operatively coupled to one or more VFEs that can adjust the wavefront of light incident upon a switchable screen. For brevity, the rest of this disclosure refers to a singular VFE, but it is to be understood that a plurality of VFEs can be used in the stead of single VFE in each of the embodiments. In one embodiment, the VFE modulates the wavefront of light such that an image from an operatively coupled display element (such as a scanned light display, scanned laser display, DLP, LCD, LCoS, OLED, electrochromic display, electrowetting display, LED array, or any other display technology known in the art) is brought substantially into focus upon one of the switchable screens at a given time step. In one embodiment, the switchable screens are viewed directly by a viewer. In one embodiment, the switchable screen is operatively coupled a viewing optical system that relays light from the switchable screen to a viewer, such that image elements are perceived to be at an optical viewing distance.

If the viewing optical system produces little or no field curvature, the image upon the switchable element will be relayed to form a substantially planar image to the viewer at the optical viewing distance. If the viewing optical system produces some detectable field curvature, the image upon the switchable element will be relayed to form a curved image to the viewer that subtends a range of optical viewing distances. For instance, the center of the image may be positioned at an optical viewing distance of 1 meter, while the periphery of the image may be positioned at an optical viewing distance of 1.1 meters.

A rendering system operatively coupled to a display system that produces such a curved image plane to a viewer can adjust rendering characteristics of the displayed image elements as a function of their lateral position within the image. For instance, the rendering system can render objects intended to be at 1 meter in the center of the image, and render images intended to be at 1.1 meters in the periphery of the image. The rendering system can also render a simulated focus and depth of field for image elements as function of lateral position within the image. E.g., in a 3D rendering system comprising a virtual camera, the focus of the virtual camera used to capture a projection of the 3D volume can be placed at 1 meter for image elements in the center of the image and at 1.1 meters for image elements near the edge of the image.

If a plurality of switchable screens are stacked such they occupy different viewing distances from a viewer (viewing the screens either directly or indirectly via an optical system), then a plurality of image elements can be projected upon the plurality of switchable screens, such that light comprising different image elements reaches the viewer from different optical viewing distances. A viewer looking at the light field from the plurality of switchable screens can perceive a 3D volumetric image, with different objects at different focus levels and viewing distances. For instance, if the plurality of switchable screens comprises 10 layers of PDLC switchable diffusers, then a rendered (and/or captured) 3D scene can be sliced into 10 image slices, with each image slice being projected to a different PDLC screen.

The different image slices may be projected by an operatively coupled display system to the stack of PDLC screens in a frame-sequential fashion, with the one PDLC layer being switched into a diffusive state and the other PDLC layers being switched into a transparent state at each time step, such that only one layer acts as a diffusing screen at a given time step. An operatively coupled VFE, such as a variable focus lens, can modulate the wavefront of light from the operatively coupled display element in a synchronous frame-sequential fashion, such that each slice of the rendered image is brought into focus on the PDLC layer that is switched into a diffusing state.

The switchable screens can be used in a rear projection configuration and/or a front projection configuration. It can be a challenge to produce a VFE that simultaneously achieves a large effective aperture, large focus range, low power consumption, and high-speed focus modulation. The system described herein enables a relatively small VFE to be operatively coupled to a display source, as an operatively coupled stack of switchable screens increases the effective NA of the relayed images to support a large eyebox, despite a small aperture in the VFE.

In the art, it is known that it is non-trivial to design and fabricate an optical system to relay light from a display source without imparting some amount of field curvature. Optical systems that are well corrected for field flatness are often larger, and more complicated and more costly to design and fabricate than an optical system that does not fully correct field curvature in relayed light.

This disclosure also describes the use of a VFE to physically modulate the wavefront of incident light to perform field flattening or correction of field curvature. In one embodiment, the VFE is used to modulate the wavefront of light comprising image data that is incident upon the VFE, in order to perform field flattening to adjust an incoming light from a curved image field to form a substantially planar image field. In one embodiment, the light exiting the VFE is field flattened and brought substantially into focus upon a screen (such as a switchable screen, as described herein, or such as a moving screen, or such as static screen).

In one embodiment, the VFE is operatively coupled to scanned light display (such as a fiber scanned display, a scanning mirror display, a scanning laser display, flying spot display, or line scan display) such that the VFE can modulate the wavefront of light differently at different scan positions. For instance, a fiber scanned display can be driven in a spiral pattern, such as a spot that starts in the center of the field and spirals outward to the edge of the field over time, with an operatively coupled light source modulated in synchrony with the scan pattern, to project imagery.

A VFE that is operatively coupled to the fiber scanned display can change its optical power as a function of the eccentricity of the scanned spot, such that the center of a scanned image is focused with one optical power and the spots toward the edge of the image are focused with a different optical power. In this way, the curvature of the field can be adjusted dynamically on a pixel-by-pixel or line-by-line basis. This can enable an optical system with excellent field flatness in a very compact system (e.g., a single VFE instead of a stack of static lenses).

In addition to performing field flattening for an image projected to a screen at a given distance, the VFE can switch the overall focus of the image to a different screen in a plurality of switchable screens, as described herein. The VFE can correct the field curvature at each of the screen distances, to form a stack of substantially planar images comprising a 3D volume.

The VFE works as the flattener and focusing lens. The VFE may comprise a small aperture size (e.g., 3 mm), because it may be operatively coupled to a compact display source. The VFE may be driven with a continuously and smoothly varying signal, such as sinusoidal wave, to enable high frequency focus modulation while minimizing or eliminating ringing or other temporal artifacts.

A 3D display system 100 as shown in FIG. 1 can comprise a display unit 102, VFE 104, and viewing optics 106. For such a configuration it is typically beneficial to use a VFE with a large aperture, to support a large eyebox or exit pupil for a viewer. However, typical large aperture VFEs known in the art are not typically able to easily achieve fast response times, low operating voltage, compact size, low weight, and reliability for large aperture sizes.

Figure 2:
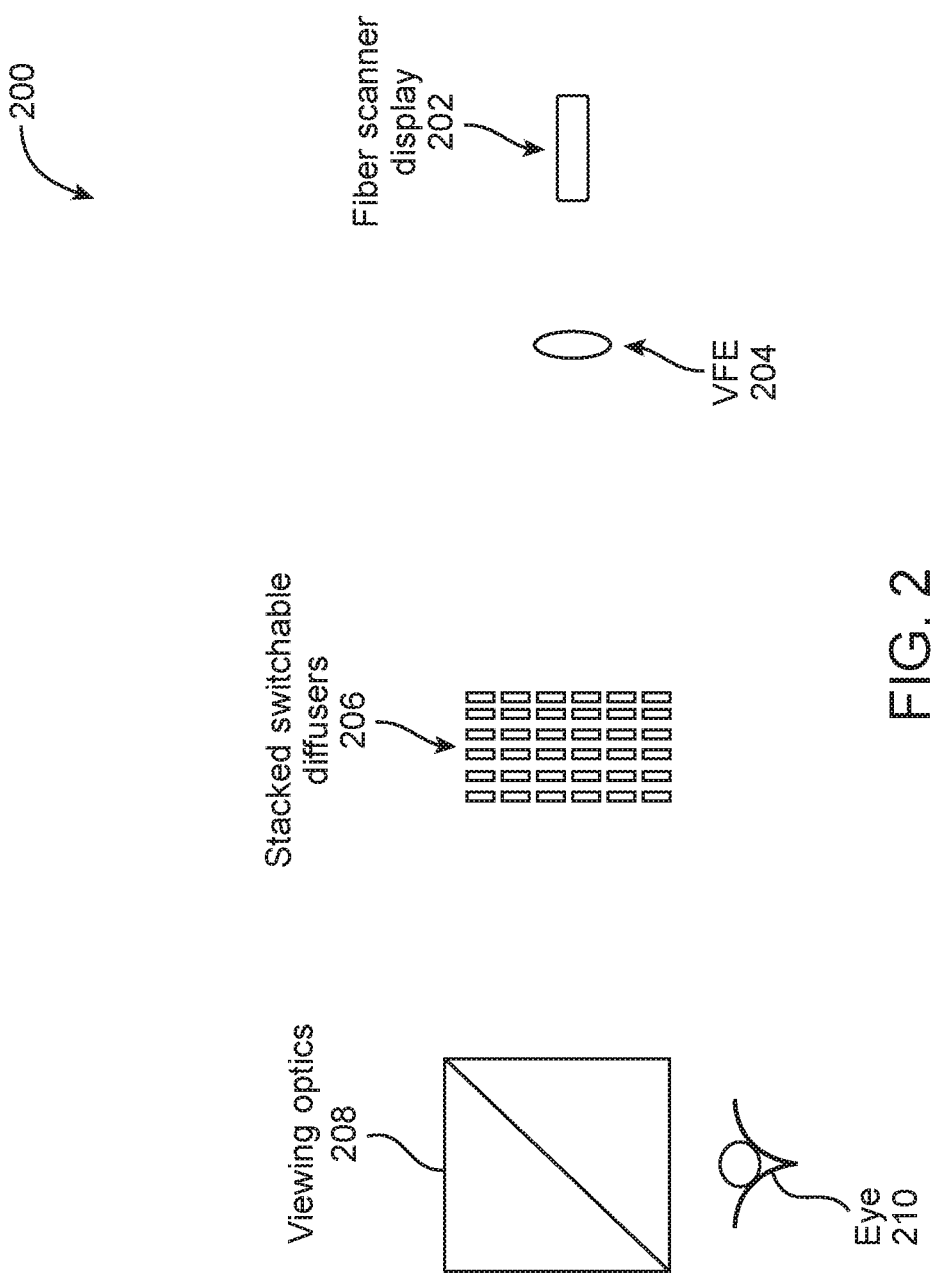
FIG. 2 illustrates a plan view of another optical system configuration including a VFE and a plurality of switchable screens along with other optics to display content, according to one example embodiment.

One embodiment is shown in FIG. 2. It comprises a fiber scanned display 202 (hereinafter "FSD") unit, a VFE 204, stacked switchable diffusers 206, and viewing optics 208. The VFE 204 can be positioned close to the FSD 202 so that a small aperture size is sufficient to receive and relay the display light. The VFE 204 can focus the light from the FSD 202 to intermediate image planes aligned with a plurality of stacked switchable screens 206, such as polymer-dispersed liquid crystal (hereinafter "PDLC") devices. At each time step, a single switchable screen is in a diffusing state while the other screens are in a substantially transparent state. The image projected upon on each switchable screen corresponds to a specific distance of a multi-focal image relayed to the viewer by the viewing optics.

Figure 3:
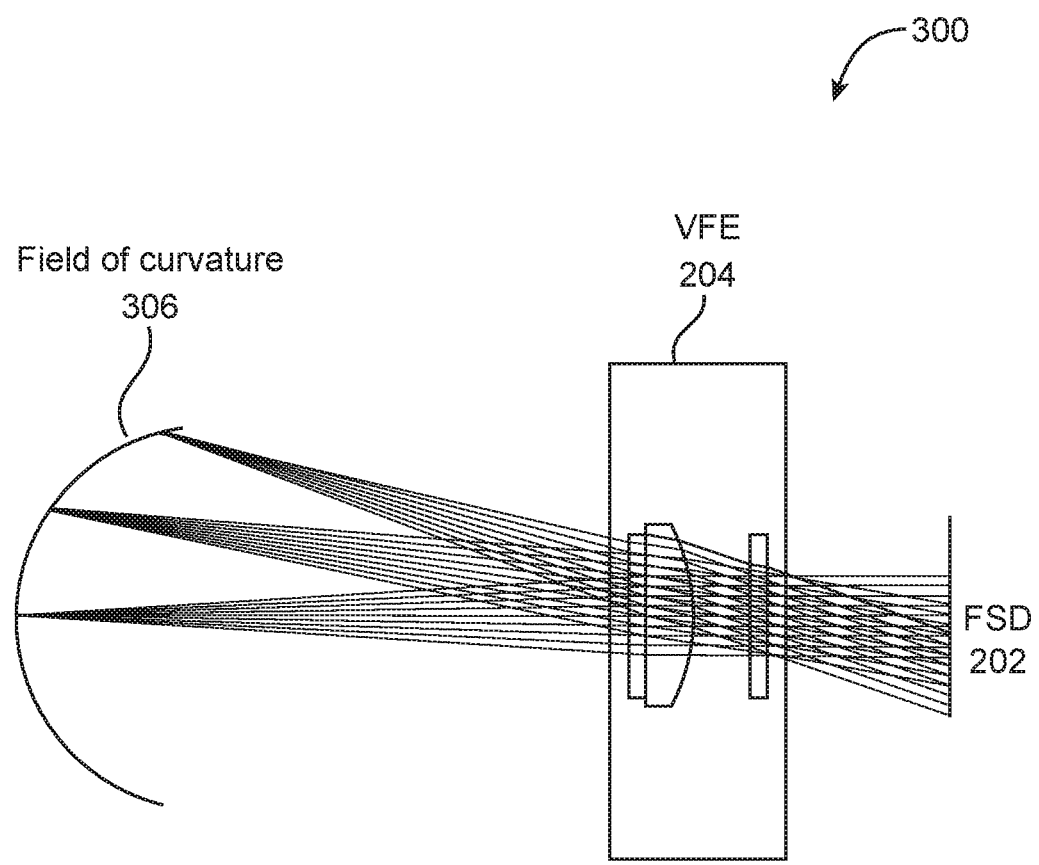
FIG. 3 illustrates an a plan view of a field of curvature when displaying a virtual image to a user, according to one example embodiment.

In addition to the field curvature that can be generated by simple conventional static lens designs, some embodiments of the FSD 202 comprise a curved image source. FIG. 3 shows a simple optical model of the total field curvature 306 produced by a given FSD 202 and VFE 204 configuration, with the VFE in one static focus state. If left uncorrected, the field of curvature could poorly align with a flat projection screen, causing some pixels to be out of focus on the screen, while others are in focus.

Figure 4:
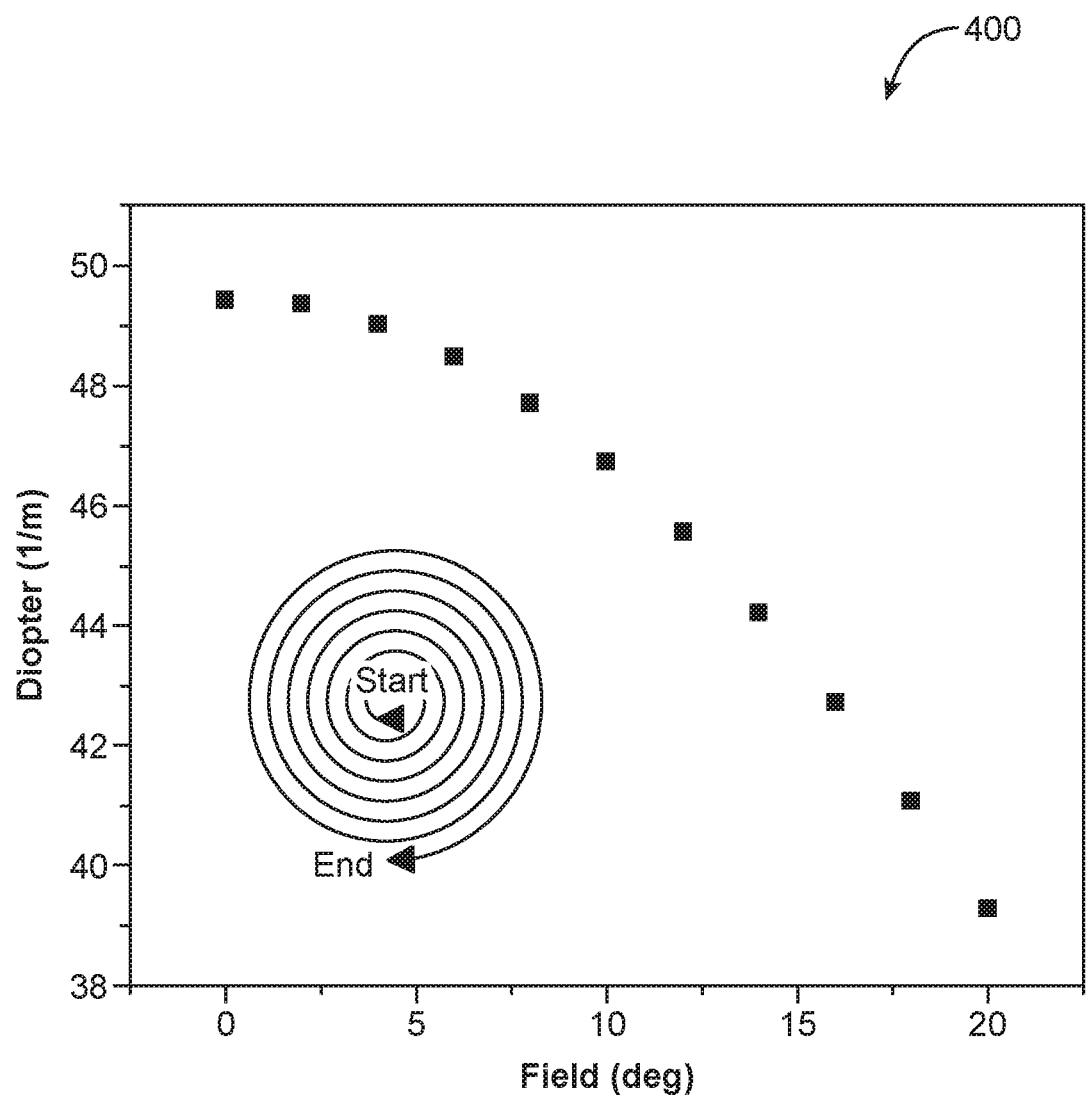
FIG. 4 illustrates an example embodiment of how one can vary the optical power (in diopters) of a VFE in coordination with a position of a scanned spot within the scan field.

FIG. 4 shows an example embodiment 400 of how one can vary the optical power (in diopters) of a VFE in coordination with a position of a scanned spot within the scan field. For instance, if the VFE is operatively coupled to a FSD scanning in a spiral pattern (bottom left of FIG. 4), the VFE can produce higher optical power for the light in the center of the scan and lower optical power for light at the periphery of the scan, smoothly varying as a function of eccentricity—yielding a substantially flat image field at the output.

Figure 5:
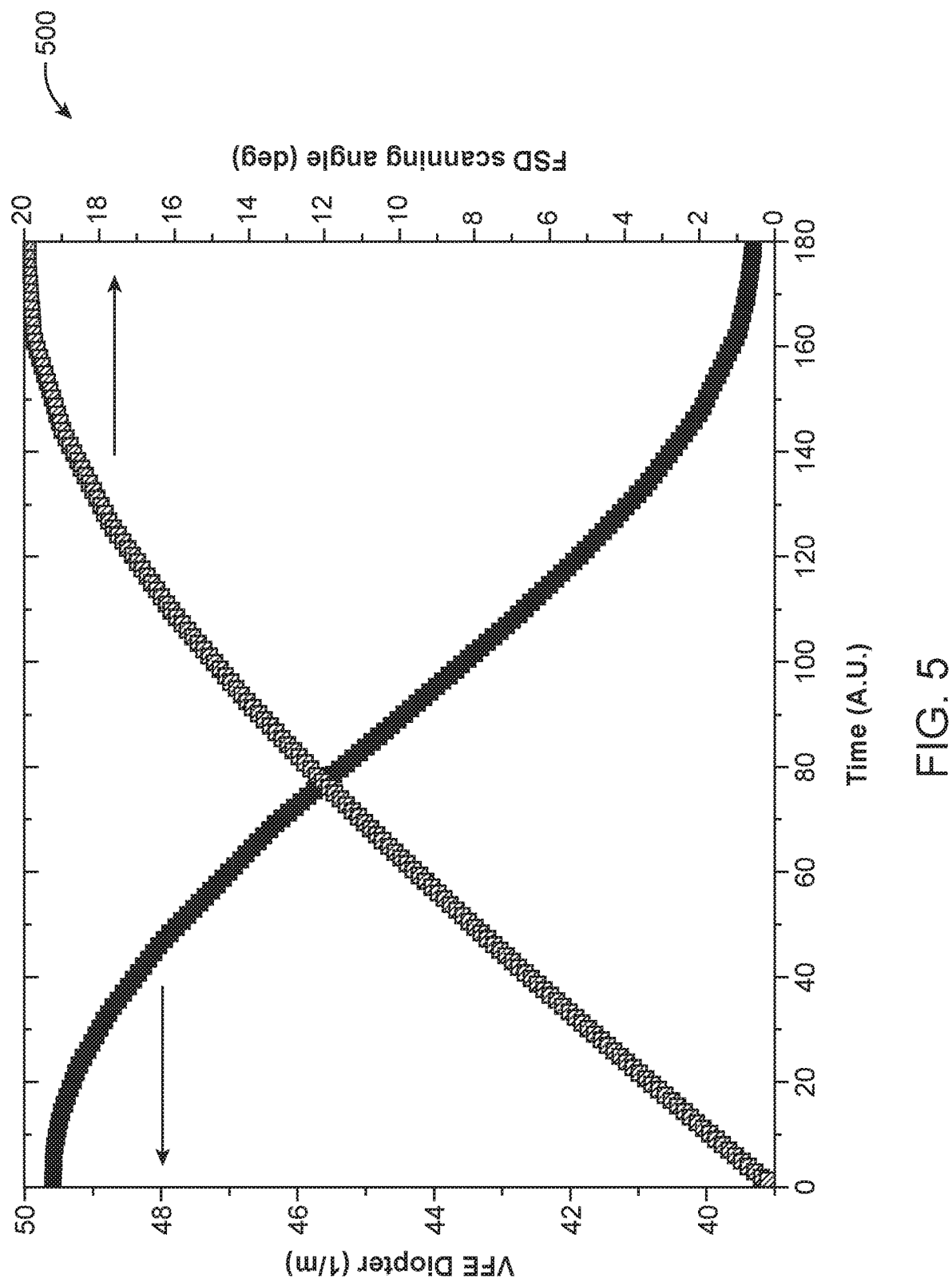
FIG. 5 illustrates a graph of a VFE drive signal against a pattern of the fiber scanning device (FSD), according to one example embodiment.

In one embodiment, the VFE is modulated in a substantially sinusoidal fashion to enable very high speed focus modulation. FIG. 5 shows an example embodiment 500 of how the scan amplitude in an FSD spiral scan drive signal can be matched to the sinusoidal oscillation of the VFE to produce a flat field at the VFE output. The units in FIG. 5 are derived from the exemplary VFE diopter to field position data in FIG. 4.

In one embodiment, the VFE drive signal is adjusted away from a perfect sine wave to match a desired FSD scan amplitude pattern, while maintaining a substantially smoothed drive signal to the VFE to minimize ringing or other drive artifacts and support high speed focus modulation.

Figure 6:
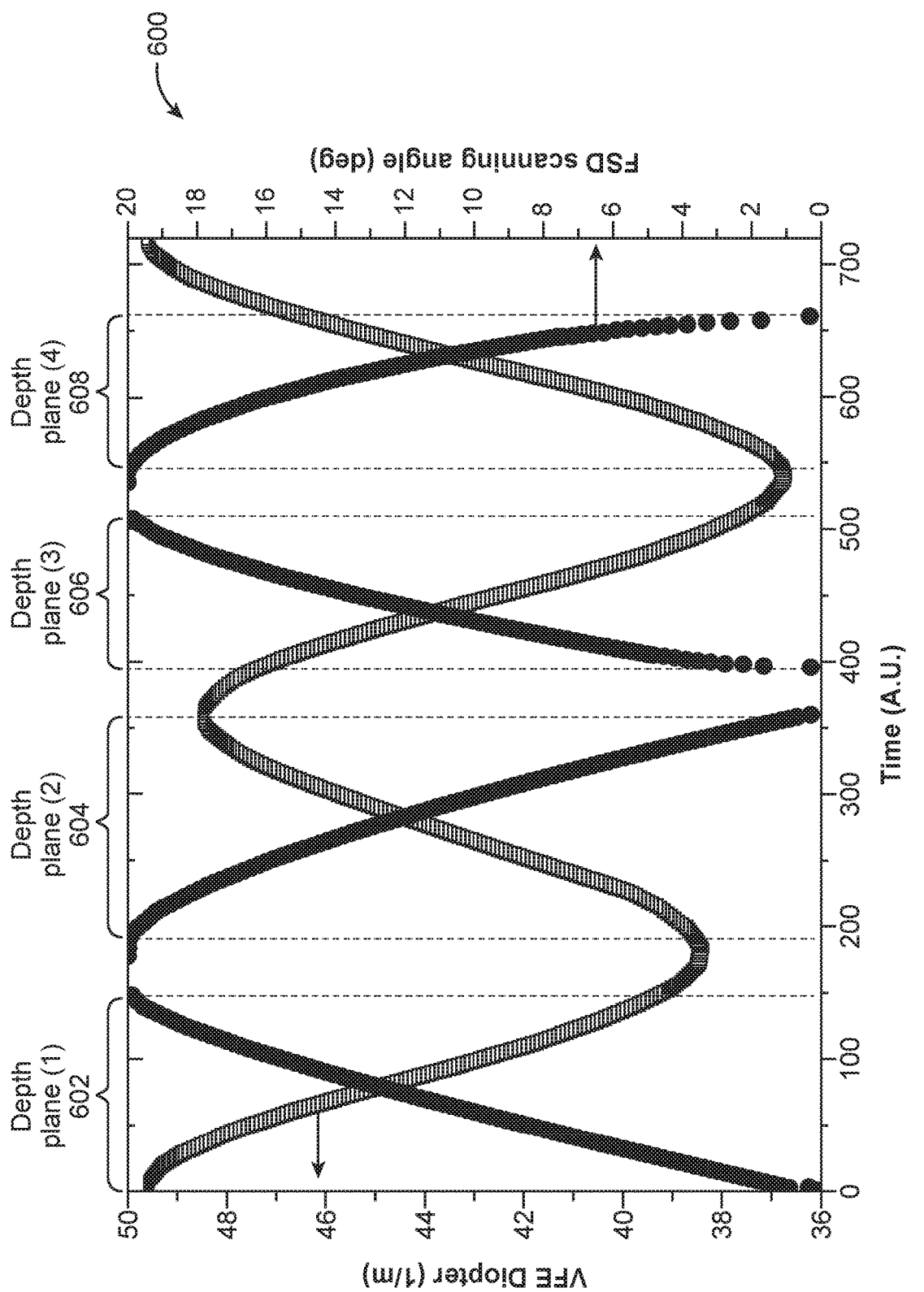
FIG. 6 illustrates a graph of a VFE drive signal against a pattern of the fiber scanning device (FSD) for four depth planes, according to one example embodiment.

FIG. 6 illustrates an embodiment 600 that generates four depth planes (i.e., fixation distances) (602, 604, 606 and 608) in a time sequential fashion. In this embodiment, the VFE is driven with a sinusoidal wave swinging through a total focus range of 36.80 diopters (1/m) to 49.58 diopters. The amplitude of the peaks and troughs of the sinusoidal wave are adjusted on a time sequential basis in synchrony with the projection of image slices by the scanned light display (e.g., FSD), such that the focus of each of the 4 image slices is swept through a different subset of the total focus range. The overall offset between the focal range subsets corresponds to different optical viewing distances of the image slices presented to a viewer. The variation within each image slice's focus range enables the center of the image to be focused with a different optical power than the periphery, correcting field curvature and producing a substantially flat image field for each depth plane. As an example, FSD scanning angles between −20° and 20° are depicted. The VFE diopter range in FIG. 6 is consistent with the exemplary VFE diopter to field position data in FIG. 4.

Figure 7:
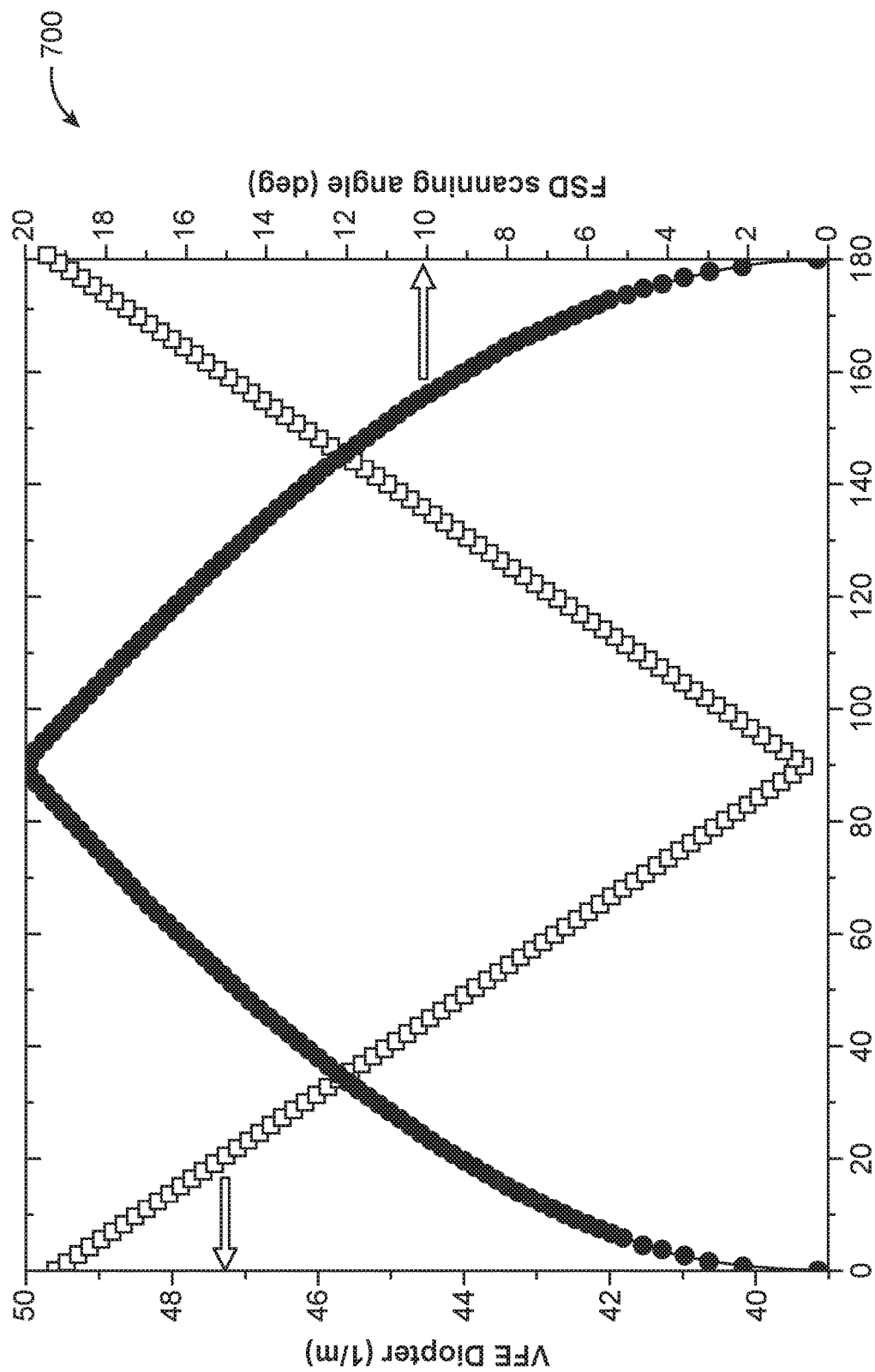
FIG. 7 illustrates another graph of a triangular VFE drive signal against another pattern of the fiber scanning device (FSD), according to one example embodiment.

FIG. 7 shows one variation 700 of a drive signal to the VFE that is not sinusoidal. In this case, a triangular wave (open squares in the Figure) is used to drive the VFE focus state. FIG. 7 also shows how the scan amplitude in an FSD spiral scan drive signal (dark circles in FIG. 7) can be matched to the oscillation of the VFE to produce a flat field at the VFE output. The units in FIG. 7 are consistent with the exemplary VFE diopter to field position data in FIG. 4.

The dynamic field flattening method and system using a VFE and the multi-focal display system comprising a plurality of switchable screens can be utilized in isolation from one another, or they can be employed in a shared system to good effect.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. An augmented reality display system, comprising:
a scanning device for scanning one or more frames of image data, wherein the scanning device is communicatively coupled to an image source to receive the image data;
a plurality of switchable screens stacked along an optical axis of the system and configured to provide a first aperture and comprising a first switchable screen in a diffusive state and a second switchable screen in a transparent state at a time point during operation;
a variable focus element (VFE) configured to provide a second aperture, and configured to reduce a field curvature produced by the scanning device, wherein the VFE is also configured for variably focusing the one or more frames of image data among the plurality of switchable screens that spreads light associated with the image data to corresponding viewing distances, wherein the plurality of switchable screens is configured to provide the first aperture that is larger than the second aperture of the variable focus element; and
viewing optics operatively coupled to the plurality of switchable screens to relay the one or more frames of image data.

2. The augmented reality display system of claim 1, wherein each of the plurality of switchable screens occupies a different viewing distance from a viewer.

3. The augmented reality display system of claim 1, wherein the image data is divided into a number of image slices equal to a number of switchable screens in the plurality of switchable screens.

4. The augmented reality display system of claim 1, wherein the plurality of switchable screens comprise switchable polymer dispersed liquid crystal (PDLC) diffusers.

5. The augmented reality display system of claim 1, wherein the scanning device comprises a fiber scanned device (FSD).

6. The augmented reality display system of claim 1, wherein the plurality of switchable screens switch between a diffusive state and a transparent state.

7. The augmented reality display system of claim 6, wherein one switchable screen of the plurality of switchable screens is switched into the diffusive state and a remaining number of screens are switched into the transparent state.

8. The augmented reality display system of claim 6, wherein the plurality of switchable screens is switched between the diffusive and transparent state on a frame-by-frame basis.

9. The augmented reality display system of claim 1, wherein the VFE is associated with a relatively smaller aperture.

10. The augmented reality display system of claim 1, wherein the scanning device scans the one or more frames of the image data in a scanning pattern.

11. The augmented reality display system of claim 10, wherein a drive signal of the VFE is varied as a function of the scanning pattern of the light modulator.

12. The augmented reality display system of claim 11, wherein the VFE flattens a field curvature of the one or more frames of the image data.

13. The augmented reality display system of claim 11, wherein an optical power of the VFE is varied as a function of a position of a scanned spot within a scan field of the scanning device.

14. The augmented reality display system of claim 11, wherein a first portion of an image is focused differently than a periphery of the image.

15. A method of displaying augmented reality, comprising:
providing one or more frames of image data;
scanning light associated with the one or more frames of the image data in a scanning pattern with at least a scanning device;
switching a first switchable screen of a plurality of switchable screens stacked along an optical axis of the system into a diffusive state and a second switchable screen of the plurality of switchable screens into a transparent state at a time point, wherein the plurality of switchable screens is configured to provide a first aperture;
varying a focus of the scanned light through a variable focus element (VFE) to focus the one or more frames of the image data on one of plurality of switchable screens, wherein the plurality of switchable screens is configured to expand a second aperture provided by the variable focus element into the first aperture that is larger than the second aperture;
reducing a field curvature produced by the scanning device in scanning the light associated with the one or more frames of the image data; and
spreading the light through the one of the plurality of switchable screens, wherein the plurality of switchable screens corresponds to different viewing distances.

16. The method of claim 15, wherein each of the plurality of switchable screens occupies a different viewing distance from a viewer.

17. The method of claim 15, further comprising dividing the image data into a number of image slices equal to a number of switchable screens in the plurality of switchable screens.

18. The method of claim 15, wherein the focus is varied on a frame-by-frame basis.

19. The method of claim 15, wherein the one or more frames of the image data is presented in a time-sequential manner.

20. The method of claim 15, wherein the plurality of switchable screens comprises switchable polymer dispersed liquid crystal (PDLC) diffusers.

21. The method of claim 15, wherein the plurality of switchable screens switches between a diffusive state and a transparent state.

22. The method of claim 21, wherein the plurality of switchable screens is switched between the diffusive state and the transparent state on a frame-by-frame basis.

23. The method of claim 15, wherein the VFE is associated with a relatively smaller aperture.

24. The method of claim 15, further comprising varying an optical power of the VFE as a function of a position of a scanned spot within a scan field of the light.

25. The method of claim 15, further comprising driving a signal of the VFE to match the scanning pattern of the light.

26. The method of claim 15, wherein a first portion of an image is focused differently than another portion of the image.

27. The method of claim 15, further comprising adjusting a drive signal of the VFE to match the scanning pattern of a light modulator to produce a flat image field.

* * * * *